Figure 1:
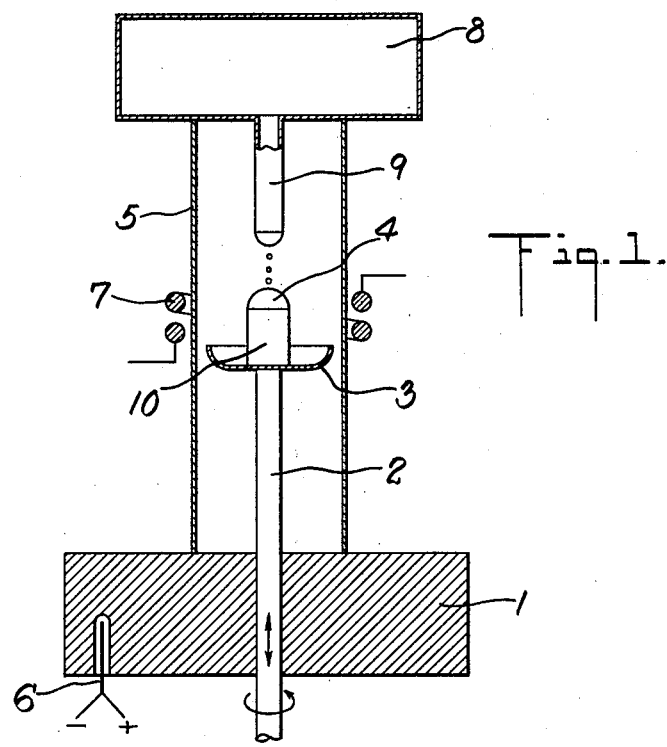

April 14, 1964  E. ENK ETAL  3,129,059
PROCESS FOR MANUFACTURING HIGH PURITY GALLIUM ARSENIDE
Filed April 18, 1961

INVENTORS
EDUARD ENK
HERBERT JACOB
BY JULIUS NICKL

D. Malcolm
ATTORNEY

United States Patent Office 3,129,059
Patented Apr. 14, 1964

3,129,059
PROCESS FOR MANUFACTURING HIGH PURITY GALLIUM ARSENIDE
Eduard Enk, Herbert Jacob, and Julius Nickl, all of Burghausen, Upper Bavaria, Germany, assignors to Wacker-Chemie G.m.b.H., Munich, Germany, a corporation of Germany
Filed Apr. 18, 1961, Ser. No. 103,832
Claims priority, application Germany Apr. 27, 1960
4 Claims. (Cl. 23—204)

This invention relates to the manufacture of high purity chemical compounds, and it has for its object to provide a novel and improved process for this purpose.

Another object of the invention is to produce high purity chemical compounds or alloys within the confines of a reaction vessel but out of contact with the walls of such vessel so that the reaction product is free from impurities which may be present in the structure of the vessel.

Another object is to produce high purity compounds in the form of rods, pipes and other external shapes of the type which have heretofore been shaped by the walls of the reaction vessels in which they were made and were therefore more or less contaminated by impurities present in such walls.

Still another object is to provide a process of the type specified in which the external shape of the body to be manufactured can be changed without changing the shape of the reaction vessel.

Various other objects and advantages will be apparent as the nature of the invention is more fully disclosed.

It is known to manufacture highly pure compounds with semi-conductor properties by melting one of the components in a vessel and adding the other component to the melt in the form of a gas or vapor. In these processes the melt always touches the sides of the vessel. Since the purity of the sides of the vessel determines the kind and quantity of impurities in the melt produced, the use of those processes where the melt touches the sides of the vessel is limited by the purity of the vessel materials.

Another drawback of the prior art processes lies in the limitation of the external form of the compound made, due to the form of the vessel. For instance, cylindrical rods can be made only when tubular vessels are used. But this has the drawback that the melt gets in touch with comparatively large surface areas of the vessel material and takes up impurities.

The semi-conductor arts, the optical industry and many other branches of industry are looking mainly for II/VI-, III/V- or IV/IV-compounds with extremely few impurities. The majority of these compounds have a volatile component, especially the nitrides, phosphides, arsenides, selenides and sulfides, i.e. under the conditions of the formation of the compound, one of the components shows a greater volatility than the other. For instance, the vapor pressure of arsenic during the formation of gallium arsenide from gallium and arsenic is about 1 atmosphere, while the gallium pressure is not measurable.

We have discovered a process for manufacturing, without a crucible, high purity bodies by chemical reaction of gaseous reaction partners in one or more high-temperature melting stages without touching the sides of the reaction vessel. The process is characterized by the fact that a volatile component, present in sufficient quantity in the reaction chamber, is brought to react with a non-volatile solid or liquid component which is fed in continuously.

In this method the purity of the reaction product is not limited by the sides of the vessel. Furthermore, the growth of single crystals is not disturbed by contact with the sides, and the external shape of the body to be manufactured can be changed independently of the shape of the vessel.

Also it is possible to work continuously and to make bodies of different shapes, such as pipes, rods, plates, spirals, spheres, crucibles, hollow bodies, etc.

It is essential for our process to start from a solid nucleus or seed. This nucleus can be made of the same material as the end product, or of some inert material. If it is polycrystalline, it is preferable for manufacturing polycrystalline bodies; if its structure is monocrystalline, it is possible to build up monocrystalline bodies.

The process can be varied in different ways and is adaptable. Thus the process is not only suitable for making compounds with semi-conductor properties. It is also possible to apply it for making compounds with other dominant properties, such as mechanical, magnetic, optical, catalytic, or thermal properties. In particular, the process permits the making of I/VII-, II/VI- and III/V-compounds, and also nitrides, phosphides, arsenides, antimonides, oxides, sulfides, selenides, tellurides, halides, borides, carbides, silicides, germanides, stannides, of inter-metallic compounds and their mixtures. However, the process is not limited to the compounds mentioned. In general it enables the manufacturing of shaped bodies from melted and gaseous materials, without having the melt touch the walls of the vessel.

Suitable for volatile starting products are elements and/or inorganic and/or organic compounds of the 5th, 6th and 7th main groups of the periodic system singly or in mixtures. For instance, the defined pressure of arsenic can easily be set by heating arsenides, from which the arsenic evaporates, or arsenic hydride can be used instead of arsenic. However, other compounds which can be transformed into a gaseous state comparatively easily, and which react with the melt, can also be used. Furthermore, the starting products can be used in finely divided form, for instance as aerosol.

As non-volatile starting products we use elements, alloys, stoichiometric and non-stoichiometric inorganic or organic compounds, inter-metallic compounds, solid solutions singly or in mixtures. There the non-volatile part of the melt can be introduced in a liquid or solid state. During discontinuous introduction it is possible to form regions of different compositions. This can also be achieved by introducing the volatile starting substances into the melt at different pressures or different flow speeds or concentrations.

The direct heating of the melting zone, whose temperature can be even higher than the melting point of the reaction product, is done advantageously by electric high frequency. However, heating is also possible by means of passage of electric current, radiant or convection heat, bombardment with electrons, or a combination of the various heating processes mentioned. When the condensation temperature of the volatile component is higher than the room temperature, it is often necessary to heat the walls of the vessel also and to keep them at a temperature different from that of the melt. Suitable for heating the walls of the vessel are radiant or convected heat, coiled heating wire or other conductor coverings, for instance semi-conducting oxide or metal films.

The temperature range in which the process can be used is not limited by the stability of the vessel materials, because any touching between the melt and the walls is avoided. It is possible to work with temperatures up to several thousand degrees. This is a definite advantage in comparison with other known processes.

Since the melt does not touch the walls of the reaction chamber, one has a great freedom of choice of the work material and the strength and thickness of the walls. It is even possible to use pressures of several hundred atmospheres.

The volatile component can be introduced into the zone of fusion as a stationary gaseous phase or as a flowing gas. In case of working with the flowing method it may be useful to use an inert gas as a carrier. For instance, the process can be used for the manufacture of compounds which are not compounded stoichiometrically.

The non-volatile components can be introduced into the melting zone from above, from the sides or from below in solid state as granules, rods or wires or in liquid form by means of gravity, centrifugal force, magnetic and/or electric forces.

The melt can be in the form of drops hanging and/or lying on a surface and/or as melting ring and/or as zone of fusion. For rods, pipes and similarly shaped bodies it is advantageous for the melt to be in the form of drops, and for pipes the melt can be formed hanging as a ring or lying on a surface. However, it is also possible to make one or several melting zones which comprise the entire or only parts of the cross-section.

When making bodies with large cross-sections it is useful to stabilize the melting zone by any suitable means, such as electromagnetic supporting fields or by a solid part lying in the center or at the periphery of the body. Thus their shape can be altered and the shape of the body to be made can be determined thereby.

But it is also possible to work with a melt that is absolutely freely suspended. For instance, an aluminum ball is held in a known way by high frequency in a molten state by electromagnetic supporting fields in an atmosphere of arsenic or phosphorus until aluminum arsenide or aluminum phosphide has formed. After this the ball is placed on a support or a nucleus, and is allowed to solidify. The process is repeated by introducing more aluminum. Semiconductor compounds, such as arsenides, antimonides, phosphides or nitrides can be made in the same way.

Suitable materials for the reaction vessel are quartz glass, graphite, silicon carbide, tantalum, titanium; and suitable packing or luting agents are the compounds to be manufactured, or the elements to be processed, for instance gallium in the manufacture of gallium arsenide.

Figure 2:
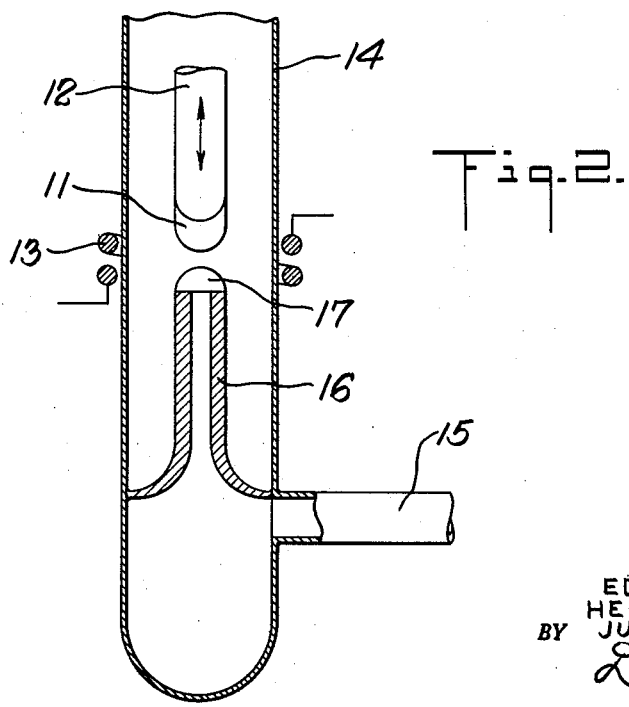

The invention will be described in connection with the accompanying drawing, in which:

FIG. 1 is a diagrammatic view of an apparatus suitable for carrying out the process of the invention; and FIG. 2 is a diagrammatic view illustrating a modification of the process.

In FIG. 1, the block or support 1 is composed of titanium which serves as a thermostat. This block supports a holding rod or shaft 2 which can be rotated and also moved axially. The rod 2 has a holder 3 at the upper end, into which a nucleus 4 with a diameter of 20 mm. and a length of 40 mm. of gallium arsenide is placed, by way of example. The quantity of arsenic necessary for producing the gallium arsenide bar is placed under protective gas upon the interior wall of the enclosed reaction vessel 5. The vessel 5 is fixedly mounted on the block 1 in any suitable manner.

The block 1 is heated up to 645±5° C. by means of any suitable heating apparatus which is not shown in the drawing. The temperature is regulated by a suitable thermoelement 6 nesting in a borehole in the block. After the desired temperature has been reached, the vessel 5 is evacuated and then the temperature of the vessel is raised and held between 700 and 800° C. The arsenic clinging to the interior wall of the vessel 5 thereby sublimates to the block 1, whose temperature regulates the pressure of the arsenic vapor in vessel 5. The upper end of the nucleus (seed) 4 is melted by the high frequency coil 7. The gallium located in storage container 8 is introduced in drops by inert gas through nozzle 9 into the melting tip or head 10. The rod 2 is pulled downward with the same speed as gallium arsenide is formed from the dripped-on gallium and the gaseous arsenic on the melting head. An electromagnetic supporting field which is at the same time formed by the coil 7 prevents the sideways drip-off from the melting head 10.

In this way it is possible to manufacture monocrystalline gallium arsenide rods if the seed crystal 4 is monocrystalline. If it is polycrystalline, one obtains polycrystalline gallium arsenide rods which may, if necessary, be transformed into monocrystalline form in the known way by zonal melting free of the crucible.

If a pipe is used as the seed or nucleus 4 it is possible to manufacture mono- or polycrystalline pipes in the same manner. Instead of arsenic one can also use as volatile components in a similarly adapted setup phosphorus, sulphur, selenium, tellurium and also nitrogen, oxygen and halogens, and as non-volatile constituents—aluminum, indium, thallium, cadmium, mercury, alkaline earth metals, alkali metals and antimony.

It is also possible to introduce the non-volatile component in liquid state from below into a hanging or suspended melting zone. A suitable arrangement is shown by way of example in FIG. 2. The melting zone 11 which hangs on the body 12 is maintained by a suitable vessel heating device 13 within the volatile component in the vessel 14. The non-volatile component is pressed upward from below through the pipe 15 in liquid form through conduit 16. On the head surface of the conduit 16 a clinging drop 17 is formed which when it reaches the melting surface 11 is absorbed and there reacts with the gaseous component. Instead of the conduit 16 solid material can also be introduced which is melted down drop by drop, for example by a separate heater, and then it is taken up by the melting zone 11.

It is possible to manufacture a highly pure body by moving the heating device or the seed, this process being continuous, and the melt does not touch the walls of the vessel during its entire duration. The introduction of the non-volatile component from below to a suspended or hanging melting zone is also possible by electromagnetic forces which lift drops from a supply of liquid below in order to introduce them into the hanging melting zone. We have observed that drops were lifted from a circular surface of the liquid whenever a symmetrical high-frequency induction field above the surface of the liquid was applied for short periods. Thus it is possible for instance in FIG. 2, to lift gallium in drop form up to the melt drop 11 from a supply of liquid from conduit 16 underneath.

The operating methods cited herein as examples can also be used on several bodies inside the reaction vessel. It is also possible during the operation illustrated in FIG. 2 to let the melting zones 11 and 17 flow together, and, by withdrawing the body 12 upward, one can pull out the liquid non-voltale component of conduit 16. In this case the melting zone is heated in such a manner that its temperature in the upper part is higher than that in the lower part, for instance by cooling the feed line 16. The elements mentioned above can also be processed in accordance with the same methods of operation.

The invention claimed is:

1. Process for producing high purity gallium arsenide which comprises placing a nucleus of gallium arsenide in a reaction vessel out of contact with the latter, evacuating said vessel, vaporizing arsenic within said vessel at a constant temperature of 645±5° C., placing a melt of gallium upon said nucleus without allowing any of said molten gallium to drop off said nucleus, whereby gallium arsenide is formed on said nucleus by a reaction between said arsenic vapor and said molten gallium.

2. Process for producing high purity gallium arsenide which comprises placing a vertically movable nucleus of gallium arsenide in a reaction vessel out of contact with the latter, evacuating said vessel, vaporizing arsenic within said vessel at a constant temperature of 645±5° C., placing a melt of gallium upon the upper surface of said nucleus without allowing any of said molten gallium to drop off said nucleus whereby gallium arsenide is formed on said nucleus by a reaction between said arsenic vapor and said molten gallium to build up said nucleus, lowering said nucleus in said vessel an amount equal to the resultant build-up of gallium arsenide on said nucleus, placing additional molten gallium upon the upper surface of the resultant built-up nucleus without allowing any of said additional molten gallium to drop off said built-up surface whereby additional gallium arsenide is formed upon said built-up surface by the reaction of said additional molten gallium and said arsenic vapor, and repeating said lowering of said nucleus in said vessel whereby within the period of said molten gallium placings and said nucleus lowerings, said nucleus is lowered in said reaction vessel at a rate equal to the rate of build-up of gallium arsenide on said nucleus.

3. Process according to claim 2, in which said gallium is introduced continuously in the form of drops in an inert gas.

4. Process according to claim 2, characterized by the fact that said nucleus is in the shape of a rod.

References Cited in the file of this patent

UNITED STATES PATENTS

| | | |
|---|---|---|
| 2,935,386 | Selker | May 3, 1960 |
| 2,938,816 | Gunther | May 31, 1960 |
| 2,993,762 | Sterling et al. | July 25, 1961 |
| 2,999,737 | Siebertz | Sept. 12, 1961 |

FOREIGN PATENTS

| | | |
|---|---|---|
| 812,818 | Great Britain | Apr. 29, 1959 |

OTHER REFERENCES

"Rare Metals Handbook," by C. A. Hampel, 1954 ed., pages 152–157, Reinhold Publishing Corp., N.Y.